(12) United States Patent
Pison et al.

(10) Patent No.: US 11,115,817 B2
(45) Date of Patent: Sep. 7, 2021

(54) DEVICE AND METHOD FOR MANAGING THE MUTUAL AUTHENTICATION FOR THE DIRECT COMMUNICATION BETWEEN MOBILE STRUCTURES OF A MOBILE RADIO COMMUNICATION SYSTEM

(71) Applicant: Air Lynx, Les Ulis (FR)

(72) Inventors: Laurent Pison, Jouars Pontchartrain (FR); François Dubois, Cauvigny (FR)

(73) Assignee: AIR LYNX, Les Ulis (FR)

( * ) Notice: Subject to any disclaimer, the term of this patent is extended or adjusted under 35 U.S.C. 154(b) by 0 days.

(21) Appl. No.: 16/730,246

(22) Filed: Dec. 30, 2019

(65) Prior Publication Data
US 2020/0213845 A1  Jul. 2, 2020

(30) Foreign Application Priority Data
Dec. 31, 2018 (EP) ..................... 18306903
Apr. 2, 2019 (FR) ..................... 1903520

(51) Int. Cl.
*H04W 12/06* (2021.01)
*H04L 29/06* (2006.01)
(Continued)

(52) U.S. Cl.
CPC ......... *H04W 12/06* (2013.01); *H04L 63/0853* (2013.01); *H04W 8/183* (2013.01);
(Continued)

(58) Field of Classification Search
CPC .............. H04L 63/0853; H04W 12/00; H04W 12/0013; H04W 12/0023;
(Continued)

(56) References Cited

U.S. PATENT DOCUMENTS

2013/0288687 A1* 10/2013 Morioka ............... H04W 36/20
 455/437
2014/0038582 A1* 2/2014 Horneman ............ H04W 76/10
 455/418

(Continued)

FOREIGN PATENT DOCUMENTS

WO  2016178554 A1  11/2016

OTHER PUBLICATIONS

3rd Generation Partnership Project; Technical Specification Group Services and System Aspects; Proximity-based services (ProSe); Stage 2 (Release 15). Jun. 2018. 130 pages.

(Continued)

*Primary Examiner* — Charles N Appiah
*Assistant Examiner* — Nicole M Louis-Fils
(74) *Attorney, Agent, or Firm* — Arc IP Law, PC; Joseph J. Mayo

(57) ABSTRACT

Provided is the use of HSS servers (41, 42) of a local mobile structure (113) and a remote mobile structure (114), as well as the USIM card (211, 221) of a link entity (21, 22), and thus also an MME emulator (51, 52) in order to manage security and in particular the right of the link entity of a given mobile structure to connect with a link entity of another mobile structure, when the link entities establish a backhaul-type data transport link in direct mode between the two mobile structures.

15 Claims, 4 Drawing Sheets

(51) Int. Cl.
- *H04W 8/18* (2009.01)
- *H04W 12/04* (2021.01)
- *H04W 12/033* (2021.01)
- *H04W 12/30* (2021.01)
- *H04W 12/72* (2021.01)

(52) U.S. Cl.
CPC ......... *H04W 12/033* (2021.01); *H04W 12/04* (2013.01); *H04W 12/35* (2021.01); *H04W 12/72* (2021.01)

(58) Field of Classification Search
CPC ........... H04W 12/00514; H04W 12/04; H04W 12/06; H04W 4/00; H04W 4/40; H04W 4/70; H04W 4/80; H04W 76/14; H04W 88/10; H04W 88/12; H04W 88/18; H04W 8/183; H04W 92/12
USPC ......................................................... 455/411
See application file for complete search history.

(56) References Cited

U.S. PATENT DOCUMENTS

| | | | |
|---|---|---|---|
| 2015/0350859 A1* | 12/2015 | Hiben | H04B 7/15507 455/404.1 |
| 2016/0174273 A1* | 6/2016 | Ginnela | H04W 8/005 455/39 |
| 2016/0344726 A1* | 11/2016 | Stojanovski | H04L 9/3247 |
| 2017/0150363 A1* | 5/2017 | Tenny | H04W 12/0017 |
| 2017/0238359 A1* | 8/2017 | Atarius | G01S 7/4817 370/259 |
| 2018/0020442 A1* | 1/2018 | Nair | H04L 5/003 |

OTHER PUBLICATIONS

Extended European Search Report issued in European Application No. 19 22 0132 dated Feb. 13, 2020 (with translation), 11 pages.
3rd Generation Partnership Project; Technical Specification Group Services and System Aspects; Proximity-based services (ProSe); Stage 2 (Release 15). 3GPP TS 23.303 V15 1.0. Jun. 2018. 130 pages.

* cited by examiner

DEVICE AND METHOD FOR MANAGING THE MUTUAL AUTHENTICATION FOR THE DIRECT COMMUNICATION BETWEEN MOBILE STRUCTURES OF A MOBILE RADIO COMMUNICATION SYSTEM

The present invention generally relates to systems for radio communications with mobiles. In particular, it relates to a system supporting the direct communication between mobile structures in such a network.

PRIOR ART

Networks for telecommunication with mobiles, such as cellular networks defined by the 3GPP consortium, such as networks according to the standards GSM, UMTS, LTE ("Long Term Evolution") and its evolution LTE-A ("Advanced LTE"), allow for high-speed communications between mobile terminals. The architecture of these networks is generally based on a set of base stations, called the eNodeBs (from the English, "evolved Node B") in LTE standard, which are fixed network nodes forming the radio part of the network, called the eUTRAN in LTE standard, and which establish wireless communications with mobile terminals, called the UEs (from the English, "User Equipments") in LTE standard, via a specific radio interface, called the Uu interface in LTE standard. The radio part of an LTE network consists in eNodeBs, local or remote antennas, optic fiber links to remote antennas (CPRI links) and IP ("Internet Protocol") links connecting the eNodeBs with each other (X2 interface) and with the network core (S1 interface) via a backhaul network.

The standards associated with cellular networks and especially the LTE standard are compatible with the concept of a mobile cell, according to which a base station can itself be mobile, as installed in a mobile structure (for example, a fire brigade vehicle, or a vehicle of the "command-car" type of security forces or a movable antenna), in order to be able to project anywhere in a territory a cell capable of serving a group of mobile terminals used by police officers, firefighters, etc.

The exchanges between base stations taking place within the network must necessarily pass through the core of the network, called the EPC (from the English, "Evolved Packet Core") in LTE standard. In other words, the base stations of the network cannot communicate directly with each other, but only via the network core.

In some cases, however, it may be desirable to establish a communication link between two given pieces of equipment of the network without passing through the standard backhaul network and the network core, especially if the link between a base station and the network core is lost or non-functional. A typical use case is, for example, that of security and rescue forces (police, fire brigades, ambulances, etc.) which must be able to collaborate and communicate with each other following, for example, a natural disaster, such as an earthquake or a tidal wave, with the immediate consequence that the shore-based communication facilities participating in the backhaul network and/or the network core are shut down. There is therefore a need for a solution for setting up a substitution backhaul network between the mobile terminals and/or mobile cells, to compensate for the failure of the standard backhaul network and/or the equipment of the network core.

In summary, especially, but not only, in the context mentioned above, it may be useful for specific applications to establish communication links between several base stations of mobile structures, in order to make the data exchanges between these mobile structures autonomous with respect to the network core.

Nevertheless, in this context, there is the issue of the protocol for establishing a direct or indirect link between base stations and in particular the level of security associated therewith. For example, a base station comprising a management unit configured to create a plurality of virtual user terminals which are adapted to communicate in accordance with said radio protocol with base stations neighboring said base station, by using said radio interface module, has been proposed. Such base stations implemented in mobile structures such as vessels, allow to create a backhaul-type data transport network between the mobile structures, which can have a mesh topology. This mesh backhaul network allows to transmit data directly between base stations according to, for example, the LTE-Uu interface protocol for LTE base stations (namely, eNodeBs). In such a system, however, when a base station communicates with a virtual terminal associated with a neighboring base station, it does so on the same frequency band as the one it already uses to communicate with the mobile terminals in its mobile cell. As a result, the risk of interference between radio links is high. In addition, such a solution could require modifications to the EPC and raises questions in terms of security (Réseau d'accès radio LTE/LTE-A autonome et maillé pour environnements contraints, Romain FAVRAUD, PhD thesis publicly defended on Nov. 22, 2017).

A solution could be based on establishing a link of the direct mode link type so as to create a link between the corresponding mobile structure and one or more other mobile structures. A backhaul network between different mobile structures can thus be established, where appropriate with a mesh topology, for example, through link entities provided in each of the mobile structures concerned, which can be terminals specifically dedicated to these direct mode links. However, this type of link no longer allows to use the network infrastructure usually used to manage the security aspects according to known techniques of the LTE standards of the 3GPP consortium, for example. These known techniques use the secrets shared between an HSS (for "Home Subscriber Server", in English) server of the network core, and a USIM (for "Universal Subscriber Identity Module", in English) card of the mobile communications terminals, and using the EMM protocol between an MME (for "Mobility Management Entity", in English) entity and a mobile communication terminal (UE) via an eNodeb and the LTE-Uu radio interface between said eNodeB and said UE. The MME entity is the LTE network equipment managing the signaling (control plane, or "C-plane" in English) between the mobile communication terminals (UE) and the LTE network core. The USIM module is defined by the 3GPP specifications TS 21.111. It takes the form, for example, of a smart card. It stores information allowing for the authentication of the subscriber (a "subscriber" corresponding to a mobile communication terminal) when the mobile communication terminal connects to the network, by using the IMSI (from the English "International Mobile Subscriber Identity") number stored in the card and which allows a unique identification of the subscriber. To that end, the IMSI number is a unique number, which allows the authentication of a subscriber, that is to say also a user's mobile communication terminal. The USIM module also stores security keys to encrypt the transmitted data, and to ensure the integrity thereof.

Indeed, when establishing a dUE-dUE connection (according to a mode called "D2D mode" in the present description), the eNodeb and the Uu interface are not used. The framework provided in the LTE standards for security management using the USIM module and the HSS server (shared secret exchange) therefore cannot be used as it stands for authentication, encryption and integrity control.

Thus, there is a need for a device or a system for managing the authentication by a base station of one or more mobile terminals associated with one or more other base stations and connected to the base station via a direct mode link.

Technical Problem

The invention aims to overcome the disadvantages of the prior art. In particular, the invention aims to provide an alternative for dispensing with the fixed network infrastructure for the management of the authentication aspects, in particular the authentication of a mobile terminal such as a dUE link entity of a mobile structure participating in establishing a direct mode link with a dUE link entity of another mobile structure, while using standard authentication techniques.

BRIEF DESCRIPTION OF THE INVENTION

To that end, a first aspect of the invention provides a communication system comprising at least two mobile structures each having:
at least one base station adapted to establish cellular communication links with mobile communication terminals of the mobile structure via a determined radio interface,
a subscriber subscription server adapted to manage security information for the authentication of the mobile communication terminals of the mobile structure;
a security management entity adapted to interact with the subscriber subscription server in order to obtain and store security information associated with the mobile communication terminals served by the base station;
at least one link entity adapted to establish a direct mode link with the link entity of the other mobile structure, said link entity having an identification module adapted to store a unique identifier associated with the link entity; and,
an emulator of the security management entity of the mobile structure, accessible by the link entity and adapted to emulate the interface for accessing the subscriber subscription server of said mobile structure; and,
a proxy module adapted to transport an authentication request from the link entity of the other mobile structure to the emulator of the security management entity of the mobile structure, for the authentication of said link entity of the other mobile structure on the subscriber subscription server of the mobile structure, based on the unique identifier of said link entity of the other mobile structure.

The idea behind the invention is to use the local and remote HSS entities, that is to say of the local mobile structure and the remote mobile structure, respectively, as well as the USIM card of the corresponding local and remote link entities, in order to manage the security of each dUE link entity and in particular what will be called the remote security of the dUE entity (that is to say the right of the dUE entity of a given mobile structure to connect with a remote dUE entity belonging to a remote mobile structure), when the link entities establish a backhaul-type data transport link in direct mode between the two mobile structures. To that end, each mobile structure comprises an MME emulator (for dUE link entities only), and each link entity provides the remote dUE link entity (or entities) with access to this MME emulator via a proxy.

One advantage of the invention, in particular, is to allow the use of mobile communication terminals using known authentication techniques, as link entities for establishing backhaul-type data transport links between the mobile structures of the system. The new transport path according to the invention implemented by the system according to the invention advantageously allows the use of an identification module such as a USIM module and conventional access protocols to authenticate the link entity with respect to the system, and this as a standard mobile communication terminal.

Another advantage of the fact that authentication aspects are supported by the D2D link between the respective link entities of the mobile structures is that it is possible to use (in addition to unicast) a point-to-multipoint protocol that allows multiple signaling acquisitions to be performed.

In one embodiment, the MME emulator of each mobile structure is adapted to support data encryption and/or integrity protection in the same way as the authentication of the link terminals. Advantageously, the integrity and encryption of the C-plane plane (signaling data) and the encryption of the U-plane plane (user data) are also supported.

In addition to authentication, indeed, the principle according to the invention can also be applied to manage encryption and integrity control for backhaul-type data transport between the mobile structures via their respective dUE link entities.

In addition, the MME emulator of each mobile structure can also support the authentication and local security of the dUE entity of the mobile structure with the local HSS server of said mobile structure in order to have the authorization to operate locally.

To that end, the proprietary interface (for example of the EMM' type as discussed below) can be used between the EMM emulator and a proxy adapted for local access to the USIM card of a dUE link terminal, for exchanges as part of security procedures, from reading and locally accessing the USIM card, for local authentication, that is to say the identification to the local HSS server, of the local dUE terminal.

In addition, in the case of a dUE terminal of a mobile structure operating in standard UE mode via the LTE-Uu interface of another mobile structure, it can be authenticated to the remote HSS server of said other mobile structure.

According to other advantageous features of the system:
the determined radio interface is included among radio interfaces adapted to allow the allocation of radio resources to a direct mode link and to allow its use in a mobile communication network such as an LTE, 5G, WiMax, 3G, Wifi or Bluetooth network.
the proxy module of a mobile structure is implemented in the link entity of said mobile structure. This allows to use a conventional base station without dedicated modification while the link entity includes most of the elements necessary for establishing backhaul-type data transport links.
the link entity of a mobile structure further comprises a local access module adapted to ensure access to the identification module of the link entity in order to read the unique identifier associated with the link entity.
the security management entity emulator of each mobile structure is adapted to support an interface for accessing the subscriber subscription server of said mobile structure based on the S6a interface of the LTE standards of the 3GPP consortium. Although the invention is not limited to S6a interfaces, it is particularly suitable for the operation in conjunction with an S6a interface.

an interface for accessing the emulator of the security management entity of the mobile structure which is supported by the proxy module of the link entity of the mobile structure is based on the EMM protocol of the LTE standards of the 3GPP consortium.

the emulator of the security management entity of each mobile structure and the proxy module of the link entity of said mobile structure are adapted to allow the link entity of the other mobile structure to perform an authentication request on the subscriber subscription server of said mobile structure, as part of establishing a direct link between the link entity of the mobile structure and said link entity of the other mobile structure.

the emulator of the security management entity of a mobile structure is adapted to allow the link entity of said mobile structure to perform an authentication request on the subscriber subscription server of said mobile structure without passing through the radio interface of the base station of the mobile structure.

the link entity of a mobile structure is further configured to establish a cellular communication link with the base station of the other mobile structure via the radio interface of said base station of the other mobile structure.

the security management entity of a mobile structure is adapted to allow the link entity of the other mobile structure to perform an authentication request on the subscriber subscription server of said mobile structure.

the link entity of a mobile structure is adapted to support encryption and integrity protection of the data received from the link entity of the other mobile structure via the direct mode link, based on a security key further stored in the identification module of the link entity of said other mobile structure.

data integrity and encryption comprise integrity and encryption of the data transmitted in the C-plane plane and the encryption in the U-plane plane of the LTE standards of the 3GPP consortium.

the link entities of the mobile structures form a backhaul network between them.

the link entity of a mobile structure is configured to establish a direct mode link with the respective link entity of at least two other mobile structures according to a point-to-multipoint protocol.

According to another aspect, the invention relates to a method of mutual authentication of link entities of respective mobile structures of a communication system according to the first aspect, for establishing a direct mode link between said link entities, said method including the steps of:

transmitting, to the link entity of each mobile structure, an authentication request on the subscriber subscription server of said mobile structure from the link entity of the other mobile structure;

transporting, through the respective proxy modules of each mobile structure, the authentication request received from the link entity of the other mobile, to the emulator of the security management entity of each other mobile structure; and, presenting, to the respective subscriber subscription servers of each mobile structure, by the respective security management entity emulators of each mobile structure, the authentication request from the link entity of the other mobile structure, for the authentication of said link entity of the other mobile structure on the subscriber subscription server of the mobile structure.

Other advantages and features of the invention will appear upon reading the following description given by way of an illustrative and non-limiting example, with reference to the figures in the appended drawings in which.

DESCRIPTION OF THE INVENTION

Figure 1A:
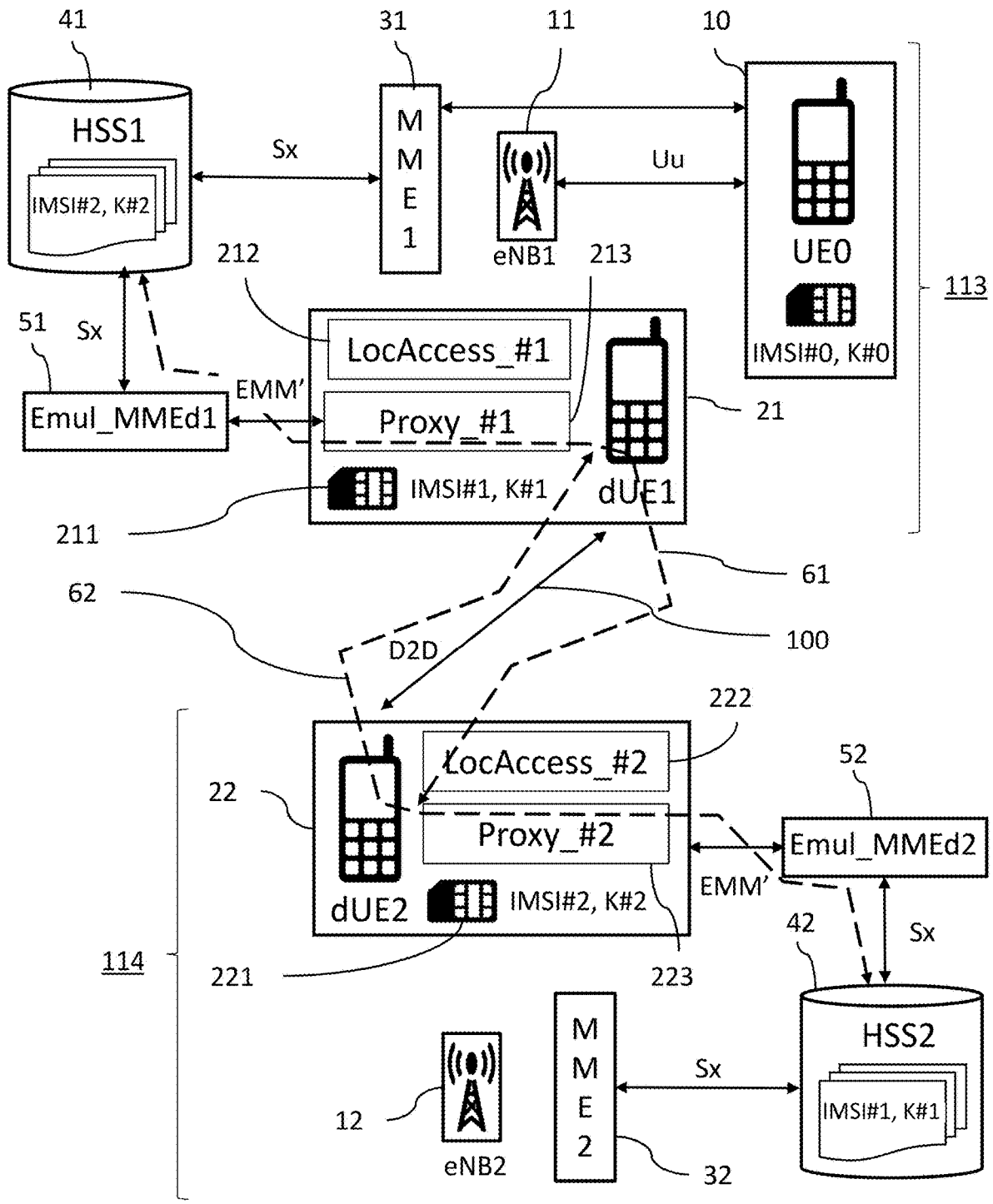
FIG. 1a is a block diagram illustrating a system for communication with mobiles comprising two mobile structures and further illustrating the management of the mutual authentication of the respective link entities of said mobile structures in the context of establishing a direct mode link between said mobile structures according to the embodiments of the invention.

With reference to the diagram in FIG. 1a will firstly be described an embodiment of a mobile radio communication system with mobile structures according to the invention.

For the purpose of this description, dedicated terminals which are adapted to establish backhaul-type data transport links between mobile structures of the system for communication with mobiles are referred to as "link entities" or "link terminals" and noted dUEs.

The terms "mobile structure" refer to an entity that comprises means of cellular communication with user terminals belonging to the mobile structure, and which is itself mobile, that is to say it can be in motion, stationary (namely, not mobile) or nomadic (namely, alternating mobility phases and stationary phases).

The term "direct", generally used in reference to modes of communication between two entities, means that no intermediate entity is involved in these communications for transporting data between the transmitting entity and the receiving entity. When used in particular with reference to a mode of communication between mobile structures such as defined above, the term "direct" means that the transport of data between two mobile structures is without the intervention of the network core through which these mobile structures normally establish their communications.

In the example shown in FIG. 1a, the mobile structures 113 and 114 are each equipped with base stations 11 and 12, which in the following will simply be referred to as eNB1 and eNB2, by reference to the jargon of the LTE standard although the invention is not limited to the context of LTE systems. The invention also applies, for example, to networks according to GSM or UMTS standards as defined by the 3GPP consortium, but also to mobile communication networks having radio interfaces adapted to allow the allocation of radio resources to a direct mode link such as a 5G, Wimax, Wifi or Bluetooth network.

The mobile structures each comprise at least one dedicated link terminal 21 and 22, respectively, called a dUE (for "dedicated User Equipment" in English) terminal. These link entities are specifically dedicated to establishing at least one direct mode (D2D) link 100 between the two base stations 11 and 12 serving the mobile structures 113 and 114, respectively. In particular, this direct mode link 100 ensure the backhaul-type data transport, that is to say it is used to establish a backhaul network, between different mobile structures 113 and 114 notwithstanding how remotely out of range they are, or the failure or destruction of fixed equipment of a network core normally performing this function.

In cases of a stationary use, that is to say when such a mobile structure does not move and is within radio range of fixed equipment in the network core that are operational, the base station of the mobile structure is able to communicate under IP protocol with these equipment through which it can exchange backhaul-type data with the base station of another mobile structure. When the mobile structure is moving, but remains within radio range of such a fixed piece of equipment of the network core that is operational, these communications are also possible and are therefore used.

In addition to the use case described above, the direct mode links covered by the invention are also, and more particularly, links which are established between mobile structures, in accordance with embodiments, for example when they are in motion and are located together at distances beyond the radio range of the on-board base stations with the fixed equipment of the network core, or when these equipment are broken or destroyed. Thus, for example, as will also be shown in more detail below, two vessels traveling on the high seas can, by implementing the invention, set up a direct mode link for backhaul-type data transport between them. In summary, the invention applies to direct mode links established not only between two moving mobile structures, but also between a moving mobile structure and a stationary mobile structure or between two stationary mobile structures.

The base stations 11 and 12, respectively, are, for example, base stations as commonly used in mobile radio communication networks based on the communication standards of 3G, 5G, Wimax, Wifi, Bluetooth, or in particular LTE, networks of the 3GPP consortium. In a way known to the one skilled in the art, and in accordance with LTE standards, they constitute the gateway between the core of the LTE network for transporting data under IP protocol, on the one hand, and the mobile communication terminals, or user equipment UEs (from the English, "User Equipment") such as the mobile terminal 10 of the mobile structure 113, on the other hand. In particular, the base stations 11 and 12 serve geographical areas defined by the extent of their radio coverage. The geographical areas form radio cells (not shown) within which radio communications are established between each base station and the mobile terminals (namely the UEs) which are connected thereto by cellular communication links, via the standard LTE-Uu radio interface of the LTE standards, for example, for a system according to LTE standards. For readability reasons, only one mobile terminal 10 of the mobile structure 113 is shown in FIG. 1*a*. However, the one skilled in the art will appreciate that the number of mobile terminals in each structure can obviously be greater than one. More generally, the example of a system for communication with mobiles shown in FIG. 1*a* is not limiting, and the one skilled in the art will appreciate that the invention can be applied to a number of mobile structures greater than or equal to two.

The base stations 11 and 12 use standard radio interfaces, such as the LTE-Uu radio interface of the LTE standards, to establish cellular communication links with all UEs present in the cell they serve and connected to the base station. The terminals present in the cells respectively associated with the different eNodeBs can therefore be standard LTE terminals, that is to say terminals that do not require any specific capacity to be used in this context. In particular, these terminals can be fully compatible with the LTE standards of the 3GPP consortium.

In addition to the entities of each of the mobile structures 113 and 114 already mentioned above, these also include dedicated user equipment dUEs, or link entities or terminals 21 and 22, respectively. As already mentioned above, the dUEs 21 and 22 allow to establish direct links for backhaul-type data transport between the two mobile structures 113 and 114. More precisely, these are links in direct mode, called D2D in the following, that is to say without any intermediate equipment. These links may be similar to links called "device-to-device" links. The dUE link terminals, already presented above, are specifically adapted for this use.

The one skilled in the art will appreciate that the link entities 21 and 22 can be configured as standard mobile terminals, and therefore have an identification module 211 or 221, respectively, such as a USIM (from the English "Universal Identification Module") card in the sense of the LTE standards. Such a USIM card allows in particular the identification of the link entity and, to that end, it is particularly adapted to store a unique identifier of the IMSI (from the English "International Mobile Subscriber Identity") type, noted IMSI #1 in the following and in the figures. This identifier is uniquely associated with the link entity. The USIM card can also be adapted to store, in addition, at least one security key noted K # i which is also associated with the link entity. More specifically, each link entity (namely each dUE) is associated with an IMSI authenticated by a key K. However, a key K can be derived to generate a plurality of keys K that ensure the encryption and integrity control of the data exchanged with the link entity. These security keys include, in particular, encryption keys.

Each mobile structure 113 and 114 also includes a subscriber subscription server 41 and 42, respectively, for example an HSS (from the English "Home Subscriber Server") as defined in the 3GPP standard for LTE networks or, for example, a VLR (from the English "Visitor Location Register") type authentication system. Each of the subscriber subscription servers 41 and 42 is adapted to identify mobile communication terminals and to manage security information for the authentication of the mobile communication terminals with which communication links are established. In addition, since the link entities can be configured as standard mobile terminals, the authentication information associated with the link entities can also be managed by the subscriber subscription servers. In other words, the subscriber subscription server 41 or 42 of each mobile structure 113 or 114, respectively, stores the IMSI # i identifiers as well as the K # i security keys associated with all UE mobile terminals and the dUE link entities that can potentially be served by the base station 11 or 12, respectively, of said mobile structure. In summary, at the level of database management, that is to say at the subscriber subscription server, it is possible to manage not only standard UEs (namely managed on a Uu eNodeb/UE by standard MME), but also dUEs intended for direct mode links and therefore for remote data transport access (used for 'bakhaul' links with remote bubbles or infrastructure).

Finally, each of the mobile structures 113 and 114 also includes a management entity 31 and 32, respectively, which is, for example, an MME (from the English "Mobility Management Entity") type entity with reference to LTE or S4-SGSN type standards, for system security management. These security management entities are adapted to interact with the subscriber subscription server 41 or 42, respectively, of the corresponding mobile structure 113 or 114, respectively, in order to obtain and store security information associated with the mobile communication terminals connected to, and served by, the base station 11 or 12, respectively, of said mobile structure. In particular, these management entities can generate and manage authentication requests (Authentication-Information-Request in Anglo-Saxon terminology) and their response in order to obtain authentication vectors from the HSS.

The one skilled in the art will appreciate that, in particular embodiments, the HSS subscriber subscription server and the MME security management entity of each mobile structure are integrated into a network core, known as the local network core as opposed to the fixed network equipment of the eNB network core of a standard LTE system, as it itself is integrated into the mobile structure.

To allow mobile structures to manage autonomously, that is to say independently from fixed equipment in the eNB network core, the mutual authentication of their respective link entities, which communicate with each other via a direct mode link to establish a backhaul-type data transport link, each mobile structure 113 and 114 also includes several specific entities. At the local level of each mobile structure, the role of these entities is to allow a remote link entity (namely belonging to another mobile structure, or remote mobile structure) to authenticate to the HSS subscriber subscription server of the local mobile structure.

Thus, each of the mobile structures 113 and 114 is equipped with an emulator of the security management entity, respectively 51 and 52, called in the following the MME emulator for short. Each of the MME emulators 51 and 52 is accessible by the link entity 21 or 22 of the mobile structure in question, which allows to emulate the interface for accessing the subscriber subscription server 41 or 42, respectively, of said mobile structure. In a non-limiting example, such an access interface can be an S6a type interface as defined in the LTE standards of the 3GPP consortium. More generally, in the different embodiments of the invention, this interface, noted Sx in the figures, may be a standard interface of the S6a or S6d type, for example, or a proprietary interface based on such a standard interface. In addition, alternately to the use of an HSS server as an authentication system, the authentication can also use, in particular embodiments, a VLR (from the English "Visitor Location Register") type authentication system. In addition, each link entity 21 and 22 also comprises a module, 212 and 222, respectively, called a local access module, which is adapted to allow access to its identification module 211 or 221, respectively. Finally, each link entity 21 and 22 further comprises a proxy module 213 and 223, respectively, also called a proxy for short in the following, which is adapted to transport to the emulator 51 or 52 of the corresponding mobile structure 113 or 114, respectively, authentication requests from one remote link entity belonging to the other mobile structure. In the present case, the proxy module 213 of the link entity 21 can transport identification requests to the emulator 51 of the subscriber subscription server 41 of the mobile structure 113. And, conversely, the proxy module 223 of the link entity 22 can transport identification requests to the emulator 55 of the subscriber subscription server 42 of the mobile structure 114. In addition, in a particular embodiment of the system, the interface for accessing the emulator of the security management entity of each mobile structure that is supported by the proxy module of the link entity of the mobile structure may be a proprietary interface that is based on the EMM (from the English "EPS Mobility Management") protocol of the LTE standards of the 3GPP consortium. Such a proprietary interface is noted as EMM' in the following and in the figures.

Finally, the MME emulator of each mobile structure and the proxy of the link entity of said mobile structure are adapted to allow the link entity of the other mobile structure to perform an authentication request on the subscriber subscription server of said mobile structure. Thus, in the example shown in FIG. 1a, when establishing a direct mode link between the link entities 21 and 22, the proxy modules 213 and 223 and the MME emulators 51 and 52 allow the two link entities 21 and 22 of each of the mobile structures 113 and 114, respectively, to mutually authenticate, namely to carry out exchanges of shared secrets, only by exchanging indirectly with the subscriber subscription server 41 and 42, respectively, of the other mobile structure. In other words, from the point of view of secret exchanges, the link entities authenticate respectively in a traditional way to the subscriber subscription servers of the other mobile structure. The difference lies in particular in the path followed for the exchanges carried out as part of this authentication. Preferably, the difference lies essentially in the path followed by the exchanges carried out as part of this authentication. To that end, the server 41 of the mobile structure 113 stores the identifier IMSI #2 of the link entity 22 of the mobile structure 114, and conversely, the server 42 of the mobile structure 114 stores the identifier IMSI #1 of the link entity 21 of the mobile structure 113.

In the different approaches described above for the mutual authentication of link entities separate from respective mobile structures, the emulator of the security management entity of a mobile structure can also be adapted to support, in addition to authentication, encryption and integrity protection of backhaul-type data to be exchanged by the link entities between them. The procedure followed is then the same as the one described here for the mutual authentication of the link entities. In addition, data integrity and encryption can be the integrity and encryption for signaling and payload data. For example, the integrity and encryption in the C-plane plane and the encryption in the U-plane plane, respectively, of the LTE standards of the 3GPP consortium.

To that end, the security keys K #1 and K #2 respectively associated with the link entities 21 and 22 may also be stored in the servers 42 and 41, respectively, in addition to the unique identifiers IMSI #1 and IMSI #2 of said link entities, respectively.

Figure 1B:
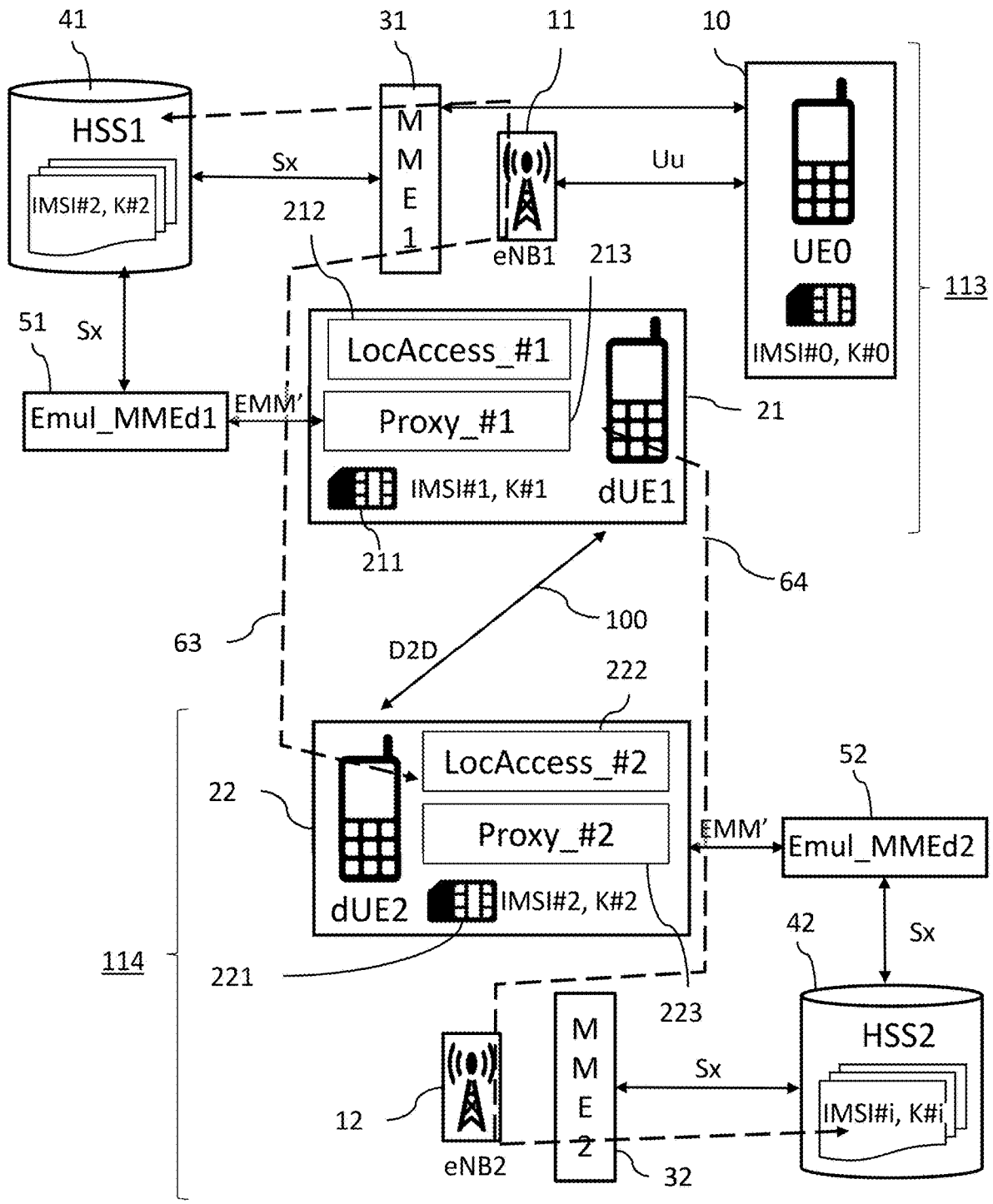
FIG. 1b is a block diagram of the system for communication with mobiles in FIG. 1a further illustrating the management of the remote authentication of the respective link entities of each of the mobile structures when used as standard mobile terminals in the other one of said mobile structures.

With reference to the diagram in FIG. 1b, the one skilled in the art will appreciate that at least one link entity 21 or 22 of the mobile structure 113 or 114, respectively, can be configured to establish a cellular communication link via the determined LTE-Uu radio interface directly with the base station of the other mobile structure 114 or 113, respectively. In this configuration, the security management entity 31 or 32 of a first mobile structure 113 or 114, respectively, may be adapted to allow the link entity of a second mobile structure 114 or 113, respectively, to perform an authentication procedure 63 or 64, respectively, on the subscriber subscription server 41 or 42, respectively, of said first mobile structure. In addition, similarly to what has been described above, the exchange between the link entity 21 or 22 of a first mobile structure 113 or 114, respectively, and the subscriber subscription server 42 or 41 of a second mobile structure 114 or 113, respectively, via the security management entity 32 or 31, respectively, of said second mobile structure, can also be performed according to the proprietary EMM' protocol. It is recalled that in one example, this proprietary EMM' protocol can be based, for example, on the EMM protocol of the LTE standards.

Figure 1C:
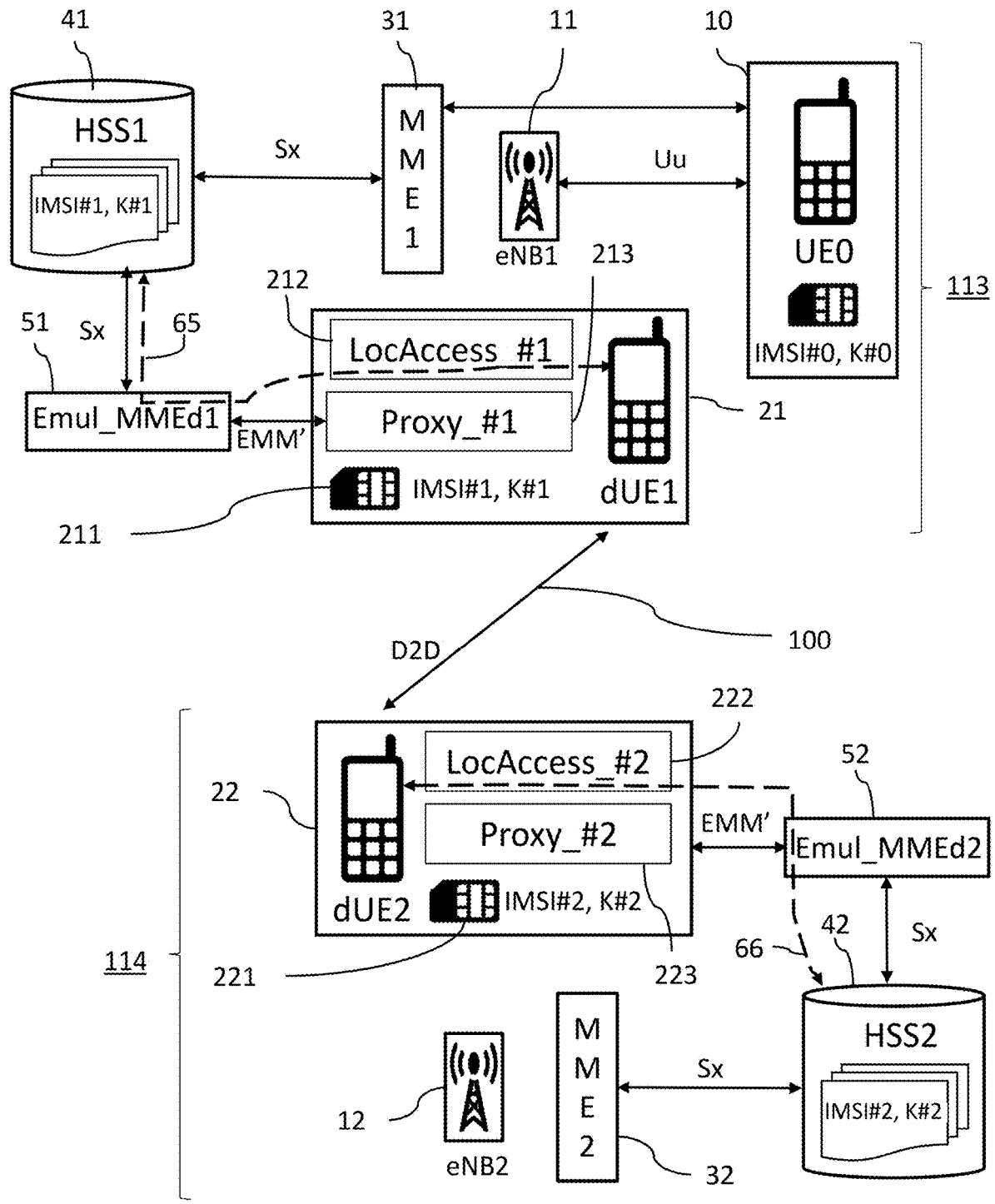
FIG. 1c is a block diagram of the system for communication with mobiles in FIG. 1a further illustrating the management of the local authentication of the respective link entities of each of the mobile structures on the subscriber subscription server of said mobile structures.

Complementarily and non-essentially, in particular embodiments of the invention illustrated in FIG. 1c, the MME emulator 51 or 52 of at least one of the mobile structures 113 and 114, respectively, can also be adapted to support an interface for accessing the local access module 212 or 222, respectively, of the link entity of said mobile structure. Thus, the interface for accessing the local access module of the link entity 21 or 22 of the mobile structure concerned 113 or 114, respectively, which is supported by the MME emulator 51 or 52, respectively, of said mobile structure, is adapted to allow said link entity to perform an authentication request 65 or 66 on the subscriber subscription server 41 or 42, respectively, of said mobile structure. This is referred to as a local access in the sense that it is a matter of the link entity accessing the subscriber subscription server of the mobile structure to which it belongs in order to itself authenticate to said server. It should be noted that this access is achieved without passing through the LTE-Uu radio interface of the base station 11 or 12 of the mobile structure 113 or 114, respectively, and is therefore an alternative to known methods of accessing the server 41 or 42, respectively, which may have advantages in certain configurations or in certain use cases.

In all the cases described above, the respective link entities of a plurality of mobile structures that are connected to each other by direct mode links can thus form a backhaul-type data transport network. The network can have a mesh structure. Advantageously, such a network can be a substitute for a fixed backhaul network when it is out of radio range, destroyed or inoperative. In addition, each link entity can also be configured so that the direct mode links it establishes with one or more link entities use a point-to-multipoint protocol. Advantageously, such a protocol allows the authentication procedure to be carried out with different remote mobile structures and for different links, but from a same link entity. Preferably, the authentication procedure with different remote mobile structures implements a link entity for each of the different remote mobile structures.

Figure 2:
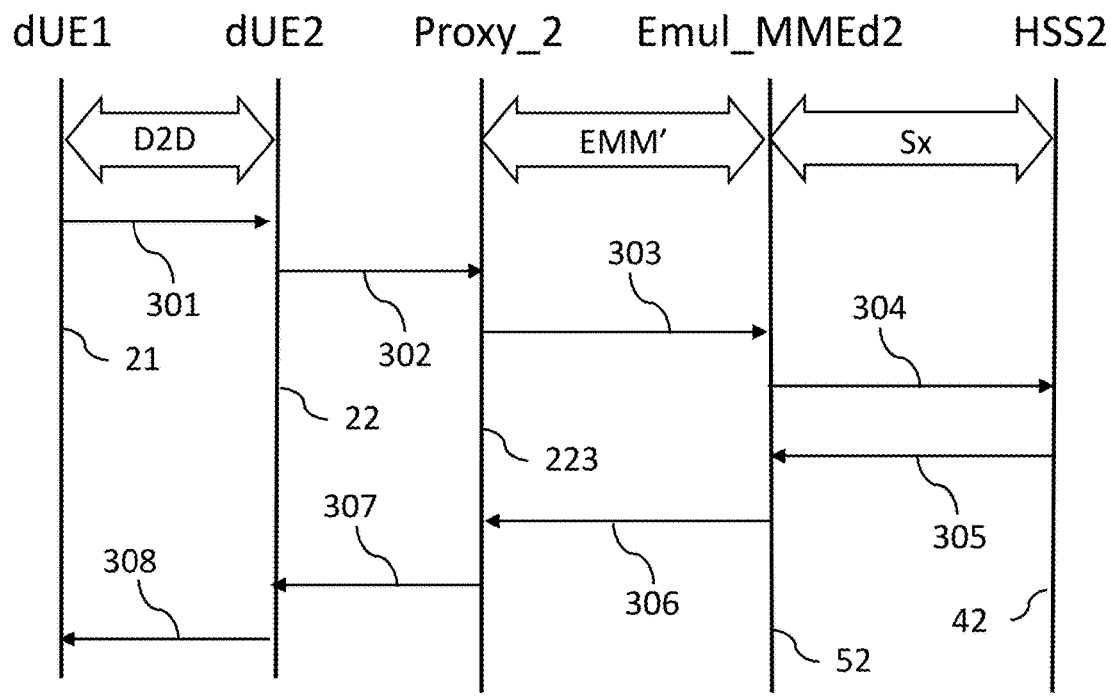
FIG. 2 is a diagram illustrating the exchanges of secrets shared between the link entities of the system in FIG. 1, for the mutual authentication of said link entities when establishing the direct mode link; and, FIG. 3 is a diagram illustrating an embodiment of a link entity of a mobile structure of the system in FIG. 1.

With reference to FIG. 2, will now be described the exchanges of shared secrets between the link entities of the system in FIG. 1a. The various steps described below are carried out when establishing a direct mode link between the two link entities of two separate mobile structures. More specifically, FIG. 2 shows the authentication procedure of the link entity 21 of the mobile structure 113 on the subscriber subscription server 42 of the other mobile structure 114. The one skilled in the art will appreciate that the authentication procedure of the link entity 22 of the other mobile structure 114 on the subscriber subscription server 41 of the mobile structure 113 is reciprocal to that described in FIG. 2, and is not described here nor illustrated in the figures. Nevertheless, it goes without saying that the mutual authentication of the link entities 21 and 22, between which the direct mode data transport link is established, requires the implementation of these two reciprocal procedures.

In step 301, the link entity 21 of the first mobile structure 113 (not shown in FIG. 2) issues an authentication request and transmits it, via the direct mode link 100, to the link entity 22 of the second mobile structure 114.

In step 302, the link entity 22 transmits the authentication request to the proxy module 223 of the second mobile structure 114.

In step 303, the proxy module 223, in turn, transmits the authentication request to the security management entity emulator 52 of the second mobile structure 114. As already mentioned above in reference to FIG. 1, this Sx transmission can, in a non-limiting example, use a standard S6a or S6d interface or a proprietary interface.

In step 304, the MME emulator 52 of the second mobile structure 114 transmits the authentication request to the subscriber subscription server 42 of the second mobile structure 114. This Sx transmission is carried out, for example, via the S6a access interface, as shown above with reference to FIG. 1.

In step 305, the subscriber subscription server 42 of the second mobile structure 114, in return, emits mutual authentication information of the first and second link entities and transmits this authentication information, via the access interface, to the MME emulator 52 of the second mobile structure 114.

In step 306, the MME emulator 52 transmits the authentication information to the proxy module 223 of the second mobile structure 114.

In step 307, the proxy module 223 of the second mobile structure 114 transmits the authentication information to the link entity 22 of said second mobile structure.

Finally, in step 308, the link entity 22 transmits, via the direct mode link 100, the authentication information to the link entity 21 of the first mobile structure 113.

The one skilled in the art will appreciate that the steps of the secret exchange method described above are described as being initiated by the link entity 21, but that they can be initiated just as well by the link entity 22, in the same way. The method is indeed reciprocal between the two link entities establishing a direct link between them. Thanks to the invention, each one can exchange with the remote subscriber subscription server belonging to the mobile structure of the other link entity.

Figure 3:
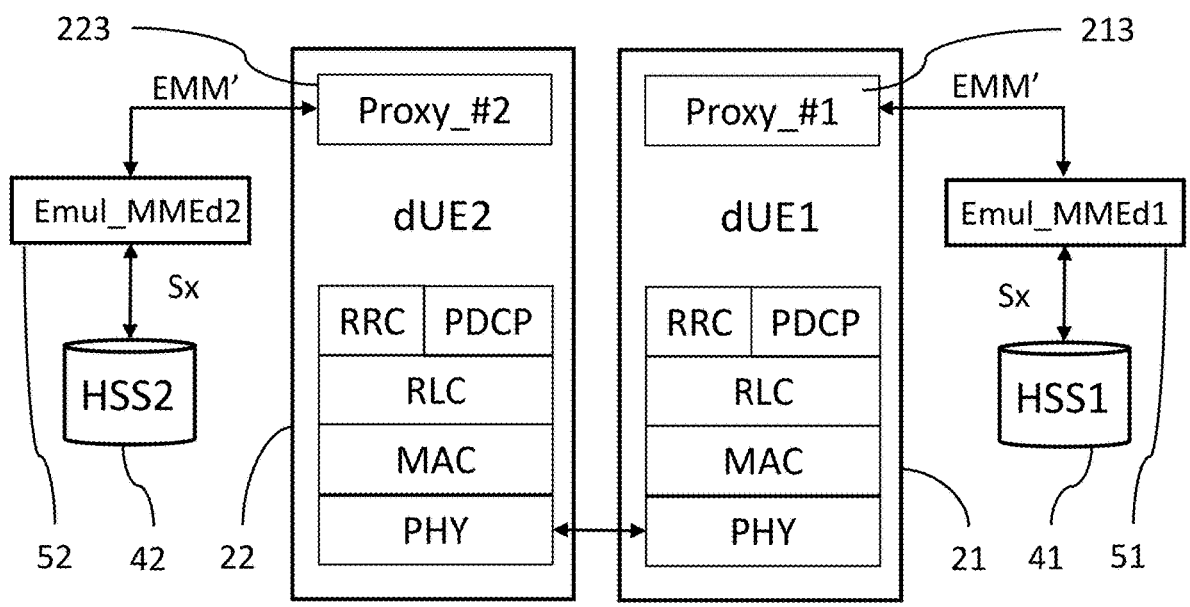

FIG. 3 illustrates the stacking of protocol layers supported by a link entity 21 and 22, according to the layered representation of the open system interface (or OSI, from the English "Open System Interface") model of the ISO ("International Standard Organization"). The one skilled in the art will appreciate that the same layers are supported by all link entities such as the link entities of a system as described in the above with reference to FIGS. 1a-1c. The lower protocol layers (namely below the application layer) are common in mobile communication networks such as LTE networks according to the 3GPP standard, and therefore do not need to be described in themselves here. Only their respective generic functions will therefore be mentioned.

The PHY layer (for "PHYsic" layer) controls the physical communication channel between the entities 21 and 22. In the present case, the direct mode link established between two link entities (dUEs) 21 and 22 belonging to the two mobile structures 113 and 114 in FIG. 1, which are distant from each other, use a radio channel. It involves, for example, the use of systems for modulating/demodulating, coding, interleaving data, etc.

The MAC (from the English "Medium Access Control") layer manages the access to the communication channel, and multiplexing on a same communication channel and/or scheduling between different "services". This layer controls the underlying layer, namely the PHY layer.

At the level above the MAC layer, the RLC (from the English "Radio Link Control") layer carries out the splitting of data down into "blocks" and encryption thereof to ensure security.

At the same level, the PDCP (from the English "Packet Data Convergence Protocol") layer manages the support of different network protocols used for transmissions, particularly through data packet headers.

Finally, the RRC (from the English "Radio Resource Control") layer manages the use of radio resources by the link entity and controls the other layers. In particular, it manages the signaling and configuration of the controls of the PHY, MAC, and RLC layers.

At the application layer above the conventional protocol layers described above (lower layers) is the application code or software that implements the proxy 213 or 223 of the link entity 21 or 22, respectively. It should be recalled that the proxy 223 of the link entity 22 of the mobile structure 114 has the function of relaying an authentication request from the link entity 21 of the mobile structure 113, to the subscriber subscription server 42 of the mobile structure 114, via the MME emulator 52 of said mobile structure 114. Conversely, the proxy 213 of the link entity 21 of the mobile structure 113 has the function of relaying an authentication request from the link entity 22 of the mobile structure 114, to the subscriber subscription server 41 of the mobile structure 113, via the MME emulator 51 of said mobile structure 113.

Although not shown in FIG. 3, the modules 212 and 222 for locally accessing the USIM cards 211 and 221, respectively, of the link entities 21 and 22, respectively, can also be implemented as a software code located at the application layer, just below or at the same level as the proxies 213 and 223, respectively.

The present invention has been described and illustrated in the present detailed description and in the figures of the accompanying drawings, in possible embodiments. However, the present invention is not limited to the embodiments shown. Other variants and embodiments may be deduced and implemented by the one skilled in the art upon reading the present description and the accompanying drawings.

In the claims, the term "comprise" or "include" does not exclude other elements or other steps. The various features presented and/or claimed may be advantageously combined. Their presence in the description or in different dependent claims do not exclude this possibility. Finally, the reference signs in the drawings shown in brackets should not be understood as limiting the scope of the invention.

The invention claimed is:

1. A communication system comprising at least two mobile structures, each mobile structure comprising:
a base station adapted to establish cellular communication links with mobile communication terminals of a respective mobile structure via a determined radio interface;
a subscriber subscription server adapted to manage security information for authentication of the mobile communication terminals of the respective mobile structure;
a security management entity adapted to interact with the subscriber subscription server in order to obtain and store security information associated with the mobile communication terminals served by the base station;
a link entity adapted to establish a direct mode link with another link entity of another mobile structure of the at least two mobile structures, said link entity having an identification module adapted to store a unique identifier associated with the link entity;
an emulator of the security management entity of the respective mobile structure, accessible by the link entity and adapted to emulate the determined radio interface for accessing the subscriber subscription server of said respective mobile structure; and,
a proxy module adapted to transport an authentication request from the link entity of the another mobile structure to the emulator of the security management entity of the respective mobile structure, for the authentication of said link entity of the another mobile structure on the subscriber subscription server of the respective mobile structure, based on the unique identifier of said link entity of the another mobile structure.

2. The communication system according to claim 1, wherein the determined radio interface is included among radio interfaces adapted to allow allocation of radio resources to a direct mode link and to allow its use in a mobile communication network such as a Long Term Evolution (LTE), Fifth Generation (5G), Worldwide Interoperability for Microwave Access (Wimax), Third Generation (3G), Wireless Fidelity (Wifi), or Bluetooth network.

3. The communication system according to claim 1, wherein the proxy module of the respective mobile structure is implemented in the link entity of said respective mobile structure.

4. The communication system according to claim 1, wherein the link entity of the respective mobile structure further comprises a local access module adapted to ensure access to the identification module of the link entity in order to read the unique identifier associated with the link entity.

5. The communication system according to claim 1, wherein the emulator of the security management entity of said each mobile structure is adapted to support an interface for accessing the subscriber subscription server of the respective mobile structure based on an S6a interface of Long Term Evolution (LTE) standards of Third Generation Partnership Project (3GPP) consortium.

6. The communication system according to claim 5, wherein an interface for accessing the emulator of the security management entity of the respective mobile structure which is supported by the proxy module of the link entity of the respective mobile structure is based on an EPS Mobility Management (EMM) protocol of the LTE standards of the 3GPP consortium.

7. The communication system according to claim 1, wherein the emulator of the security management entity of each said respective mobile structure and the proxy module of the link entity of said respective mobile structure are adapted to allow the link entity of the another mobile structure to perform an authentication request on the subscriber subscription server of said respective mobile structure, as part of establishing a direct link between the link entity of the respective mobile structure and said link entity of the another mobile structure.

8. The communication system according to claim 1, wherein the emulator of the security management entity of the respective mobile structure is adapted to allow the link entity of said respective mobile structure to perform an authentication request on the subscriber subscription server of said respective mobile structure without passing through determined the radio interface of the base station of the respective mobile structure.

9. The communication system according to claim 1, wherein the link entity of the respective mobile structure is further configured to establish a cellular communication link with the base station of the another mobile structure via the determined radio interface of said base station of the another mobile structure.

10. The communication system according to claim 8, wherein the security management entity of the respective mobile structure is adapted to allow the link entity of the another mobile structure to perform the authentication request on the subscriber subscription server of said respective mobile structure.

11. The communication system according to claim 1, wherein the link entity of the respective mobile structure is adapted to support encryption and integrity protection of data received from the link entity of the another mobile structure via the direct mode link, based on a security key further stored in the identification module of the link entity of said another mobile structure.

12. The communication system according to claim 11, wherein data integrity and encryption comprise integrity and encryption of the data transmitted in a C-plane plane and the encryption in a U-plane plane of Long Term Evolution (LTE) standards of a Third Generation Partnership Project (3GPP) consortium.

13. The communication system according to claim 1, wherein all of each of the link entity of the at least two mobile structures form a backhaul network between them.

14. The communication system according to claim 1, in which the link entity of the respective mobile structure is configured to establish the direct mode link with respective link entities of at least two other mobile structures of said at least two mobile structures according to a point-to-multipoint protocol.

15. A method of mutual authentication of link entities of respective mobile structures of a communication system comprising at least two mobile structures, for establishing a direct mode link between said link entities, each mobile structure comprising
   a base station adapted to establish cellular communication links with mobile communication terminals of a respective mobile structure via a determined radio interface;
   a subscriber subscription server adapted to manage security information for authentication of the mobile communication terminals of the respective mobile structure;
   a security management entity adapted to interact with the subscriber subscription server in order to obtain and store security information associated with the mobile communication terminals served by the base station;
   a link entity adapted to establish said direct mode link with another link entity of another mobile structure of the at least two mobile structures, said link entity having an identification module adapted to store a unique identifier associated with the link entity;
   an emulator of the security management entity of the respective mobile structure, accessible by the link entity and adapted to emulate the determined radio interface for accessing the subscriber subscription server of said respective mobile structure; and,
   a proxy module adapted to transport an authentication request from the link entity of the another mobile structure to the emulator of the security management entity of the respective mobilestructure, for the authentication of said link entity of the another mobile structure on the subscriber subscription server of the respective mobile structure, based on the unique identifier of said link entity of the another mobile structure;

said method comprising:
transmitting to the link entity of said each mobile structure an authentication request on the subscriber subscription server of said each mobile structure from the link entity of the another mobile structure;
transporting, through the respective proxy modules of said each mobile structure, the authentication request received from the link entity of the another mobile structure, to the emulator of the security management entity of each another mobile structure; and,
presenting, to the respective subscriber subscription servers of said each mobile structure, by the respective security management entity emulators of said each mobile structure, the authentication request from the link entity of the another mobile structure, for the authentication ofsaid link entity of the another mobile structure on the subscriber subscription server of the another structure.

\* \* \* \* \*